US010150496B2

(12) United States Patent
Oakes

(10) Patent No.: US 10,150,496 B2
(45) Date of Patent: Dec. 11, 2018

(54) HANDLE ASSEMBLY FOR A FOLDING PERAMBULATOR AND A FOLDING PERAMBULATOR INCORPORATING THE SAME

(71) Applicant: STROLLER TECH LIMITED

(72) Inventor: Michael John Oakes, Suffolk (GB)

(73) Assignee: STROLLER TECH LIMITED, Hong Kong (HK)

( * ) Notice: Subject to any disclaimer, the term of this patent is extended or adjusted under 35 U.S.C. 154(b) by 120 days.

(21) Appl. No.: 15/507,674

(22) PCT Filed: Aug. 28, 2015

(86) PCT No.: PCT/IB2015/056521
§ 371 (c)(1),
(2) Date: Feb. 28, 2017

(87) PCT Pub. No.: WO2016/034994
PCT Pub. Date: Mar. 10, 2016

(65) Prior Publication Data
US 2017/0240197 A1    Aug. 24, 2017

(30) Foreign Application Priority Data

Sep. 1, 2014  (GB) .................................. 1415418.1

(51) Int. Cl.
*B62B 9/20* (2006.01)
*B62B 7/14* (2006.01)
(Continued)

(52) U.S. Cl.
CPC ................ *B62B 9/20* (2013.01); *B62B 5/065* (2013.01); *B62B 7/062* (2013.01); *B62B 7/142* (2013.01);
(Continued)

(58) Field of Classification Search
CPC ........... B62B 9/20; B62B 7/062; B62B 7/064; B62B 2205/20; B62B 2205/22
See application file for complete search history.

(56) References Cited

U.S. PATENT DOCUMENTS 4,660,850 A * 4/1987 Nakao .................... B62B 9/20
                                                280/47.36
5,205,579 A * 4/1993 Kato ...................... B62B 9/20
                                                280/642
(Continued)

FOREIGN PATENT DOCUMENTS

| CN | 1789052 A | 6/2006 |
| CN | 101400561 A | 4/2009 |
| CN | 202827677 U | 3/2013 |

OTHER PUBLICATIONS

International Preliminary Report on Patentability on PCT Application No. PCT/IP2015/056521 entitled Handle Assembly for a Folding Perambulator and a Folding Perambulator Incorporating the Same (dated Mar. 16, 2017).

(Continued)

*Primary Examiner* — Katy M Ebner
(74) *Attorney, Agent, or Firm* — Hovey Williams LLP

(57) ABSTRACT

A folding perambulator has a wheeled foldable frame 1 with front frame members 10 which may be folded toward rear frame members 5 when a seating member 2 is removed from the frame 1. A handle 7 is also arranged to be foldable downwardly toward the rear wheels 3. A locking mechanism 6 is provided to permit the frame and handle to be folded. The handle includes a rotatable member 25 which, in one direction of rotation, is arranged to adjust the length of the handle by permitting telescoping of tubular members 26, 27, and in an opposite direction of rotation to cause the locking (Continued)

Figure 1:
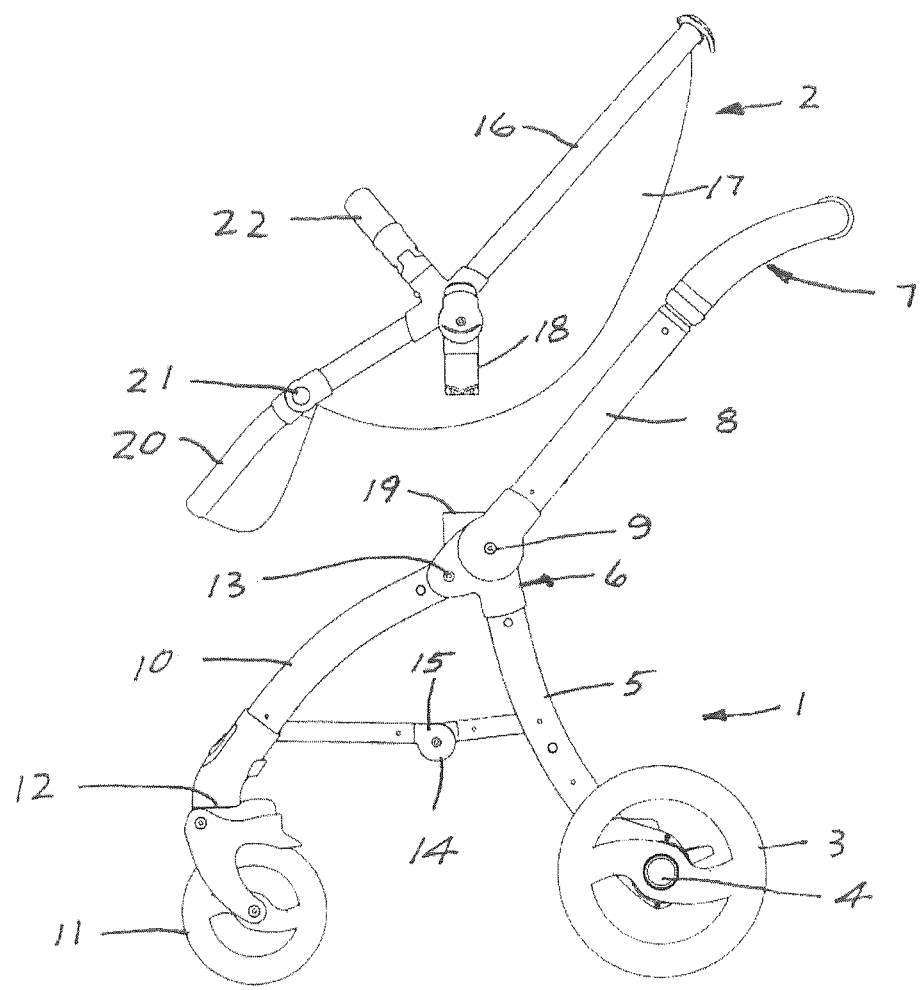

mechanism, which includes a dog clutch 80, to be disengaged to permit the frame and handle to be folded to a closed position.

14 Claims, 16 Drawing Sheets

(51) Int. Cl.
B62B 5/06 (2006.01)
B62B 7/06 (2006.01)
B62B 9/12 (2006.01)

(52) U.S. Cl.
CPC .......... B62B 9/12 (2013.01); *B62B 2205/22* (2013.01); *B62B 2205/30* (2013.01); *B62B 2206/02* (2013.01)

(56) References Cited

U.S. PATENT DOCUMENTS

| | | | | | |
|---|---|---|---|---|---|
| 5,511,441 | A | * | 4/1996 | Arai | B62B 7/08 280/47.38 |
| 5,524,503 | A | * | 6/1996 | Ishikura | B62B 9/20 16/429 |
| 5,769,447 | A | * | 6/1998 | Huang | B62B 7/08 280/47.38 |
| 6,068,284 | A | * | 5/2000 | Kakuda | B62B 9/20 280/642 |
| 6,129,373 | A | * | 10/2000 | Cheng | B62B 7/06 280/647 |
| 6,155,740 | A | * | 12/2000 | Hartenstine | B62B 7/08 280/38 |
| 6,339,862 | B1 | * | 1/2002 | Cheng | B62B 9/20 16/113.1 |
| 6,478,328 | B1 | * | 11/2002 | Yeh | B62B 7/08 16/113.1 |
| 6,964,429 | B2 | * | 11/2005 | Suga | B62B 7/08 280/47.38 |
| 7,651,115 | B1 | * | 1/2010 | Hartenstine | B62B 9/20 280/47.131 |
| 8,262,124 | B2 | * | 9/2012 | Longenecker | B62B 9/26 280/642 |
| 2002/0014752 | A1 | * | 2/2002 | Huang | B62B 7/06 280/47.25 |
| 2002/0121753 | A1 | * | 9/2002 | Suzuki | B62B 7/08 280/47.36 |
| 2002/0121766 | A1 | * | 9/2002 | Suzuki | B62B 7/08 280/647 |
| 2002/0125688 | A1 | * | 9/2002 | Yamazaki | B62B 7/06 280/642 |
| 2002/0197102 | A1 | * | 12/2002 | Cheng | B62B 7/06 403/102 |
| 2003/0071441 | A1 | * | 4/2003 | Yeh | B62B 7/06 280/642 |
| 2004/0075247 | A1 | * | 4/2004 | Lin | B62B 7/08 280/642 |
| 2005/0029775 | A1 | * | 2/2005 | Chen | B62B 7/06 280/647 |
| 2005/0275195 | A1 | * | 12/2005 | Matula | B62B 3/02 280/651 |
| 2007/0262291 | A1 | * | 11/2007 | Jane Santamaria | B60N 2/2845 254/312 |
| 2007/0262565 | A1 | * | 11/2007 | Bearup | A61K 31/409 280/642 |
| 2008/0079240 | A1 | * | 4/2008 | Yeh | B62B 7/08 280/642 |
| 2009/0121454 | A1 | * | 5/2009 | Tomasi | B62B 7/08 280/642 |
| 2009/0278335 | A1 | * | 11/2009 | Dotsey | B62B 7/10 280/647 |
| 2009/0309335 | A1 | * | 12/2009 | Van Dijk | B62B 7/06 280/642 |
| 2012/0228854 | A1 | * | 9/2012 | Mountz | B62B 9/20 280/655.1 |
| 2014/0028001 | A1 | * | 1/2014 | Mitzman | B62B 5/067 280/642 |
| 2017/0210407 | A1 | * | 7/2017 | Warwick | B62B 7/08 |

OTHER PUBLICATIONS

PCT International Search Report and Written Opinion from PCT Application No. PCT/IP2015/056521 entitled Handle Assembly for a Folding Perambulator and a Folding Perambulator Incorporating the Same (dated Dec. 18, 2015).

\* cited by examiner

HANDLE ASSEMBLY FOR A FOLDING PERAMBULATOR AND A FOLDING PERAMBULATOR INCORPORATING THE SAME

CROSS-REFERENCED TO RELATED APPLICATIONS

This is a National Phase Application pursuant to 37 C.F.R. § 371 of International Application No. PCT/IP2015/056521, filed Aug. 28, 2015, claiming priority from United Kingdom Application No. GB 1415418.1, filed Sep. 1, 2014, the entire disclosures of which are hereby incorporated by reference herein.

This invention relates to a handle assembly for a folding perambulator such as a pushchair, sometimes referred to as a buggy or a stroller, and to a folding perambulator incorporating the same.

A known handle assembly, such as that described in US 2012/0228854A1, has two separate latching mechanisms, one of which allows the length of a handle to be adjusted and the other permits the handle to move through an arc, thereby folding and inwardly collapsing the perambulator for storage. A result of using two separate mechanisms is that, in carrying out one function, it is possible for the other function to be unintentionally activated, which can be inconvenient and, possibly, dangerous.

The present invention seeks to at least partially mitigate the foregoing disadvantage.

According to one aspect of this invention there is provided a handle assembly for a folding perambulator including adjustable length handle means including a rotatable member which, in one direction of rotation, is arranged to permit adjustment of the length of said handle means only and, in an opposite direction of rotation, is arranged to adjust locking means located at a remote end of said handle means to permit the handle means to rotate about a frame, in operation, attached to said handle means.

According to a further aspect of this invention there is provided a folding perambulator including a wheeled foldable frame, and seating means detachably secured to said foldable frame, said frame having locking means arranged to hold the frame in one of an open and closed position, and adjustable length handle means arranged to predeterminedly adjust the length of said handle means, said handle means including a rotatable member which, in one direction of rotation is arranged to permit adjustment of the length of said handle means only, and in an opposite direction of rotation is arranged to adjust the locking means only to permit the frame to close.

Advantageously, the seating means includes a member arranged to interact with the locking means to prevent the foldable frame from folding when the seating means is in situ thereon.

Preferably, the handle means is generally U-shaped and the rotatable member is located in a base portion of the U-shape.

Advantageously, the U-shaped handle means has side limbs formed by telescopic tubular members to permit length adjustability and the length thereof is secured by a peg inside an internal member of each side limb of the U-shape interlocking into one of a plurality of apertures located in an outer tubular member.

Conveniently, both said pegs are biased outwardly towards said apertures by respective spring means and each peg is attached by a respective cable to a respective follower arranged to engage with respective cam means located in said rotatable member, wherein rotation of said handle in said one direction causes the followers to move toward one another against the bias of said spring means to retract each said peg from their respective apertures to permit the handle means length to be adjusted.

Preferably, the locking means includes a pair of locking mechanisms provided at a junction of an extremity of each U-shaped side limb and the frame, and each locking mechanism includes a dog clutch arranged to move out of engagement to permit the frame to open or close.

Advantageously, inter-engaging teeth on the dog clutch are arranged to be moved into and out of engagement by a reciprocal selector rod rotating one portion of the dog clutch about further cam means against the bias of further spring means arranged to bias the two portions of the dog clutch into engagement.

Advantageously, each selector rod is reciprocal to disengage the dog clutch only when the handle is in a minimum length position and said each selector rod is arranged to be engaged by a spring biased cam driven pin which is connected by a further cable to another follower arranged to engage another cam means located in said rotatable member, wherein rotation of said handle in said opposite direction of rotation causes the another followers to move toward one another while said followers remain stationary, thereby tensioning the further cables and causing one portion of the dog clutch to move about the further cam means and out of engagement with the other portion of the dog clutch to enable the frame to open or close.

Preferably, the member of said seating means is arranged to prevent said one portion of the dog clutch from moving out of engagement with the other portion of the dog clutch when the seating means is located on the foldable frame.

Advantageously, the rotatable member has remote outer edges of increased diameter to protect an intermediate surface of said rotatable member from abrasion when the frame is closed and the handle means is folded toward the wheels of said foldable frame to be ground engaging.

Figure 2:
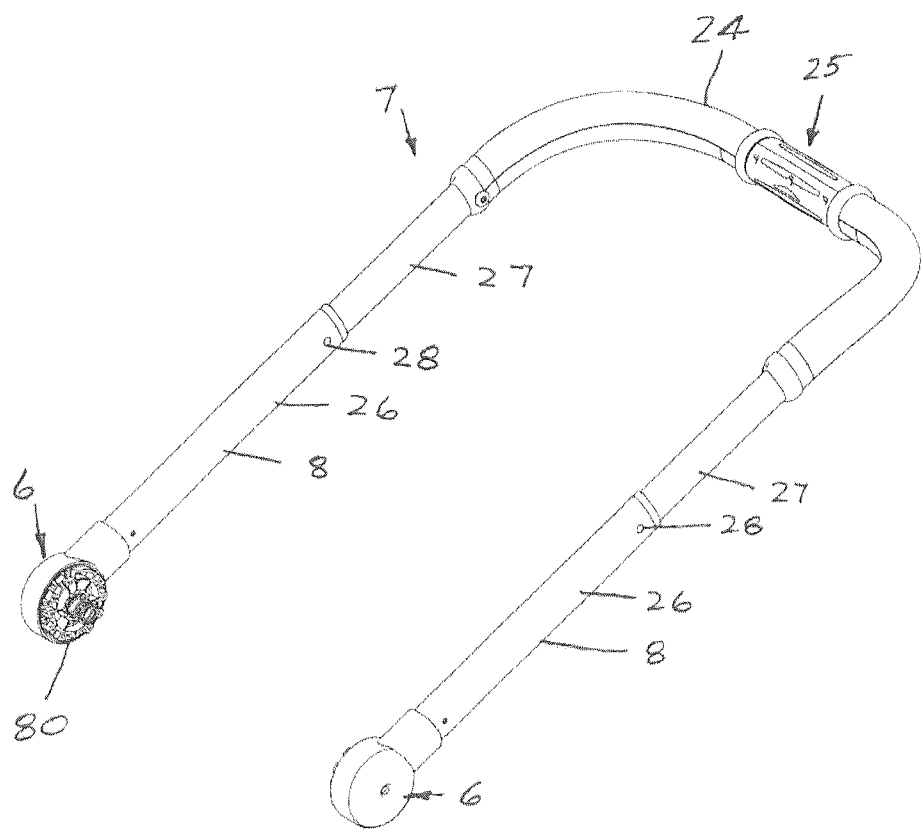
Figure 3:
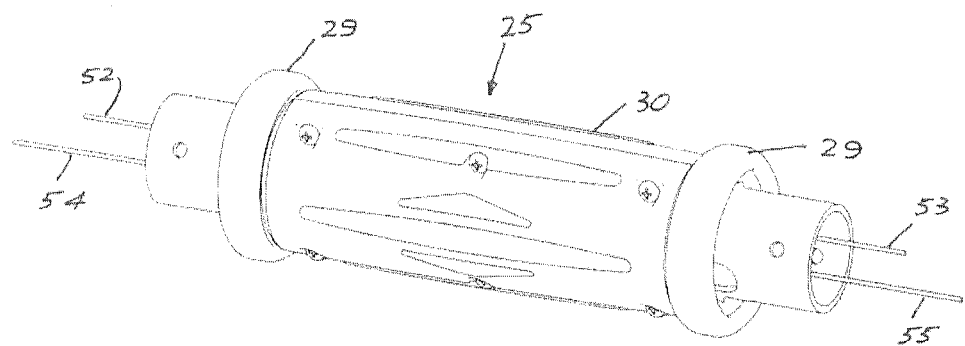
Figure 4:
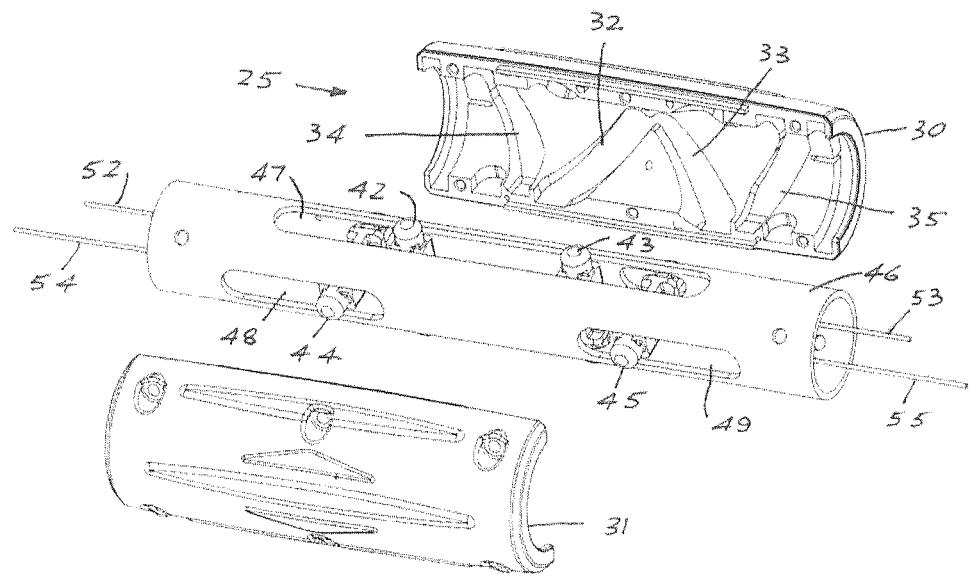
Figure 5:
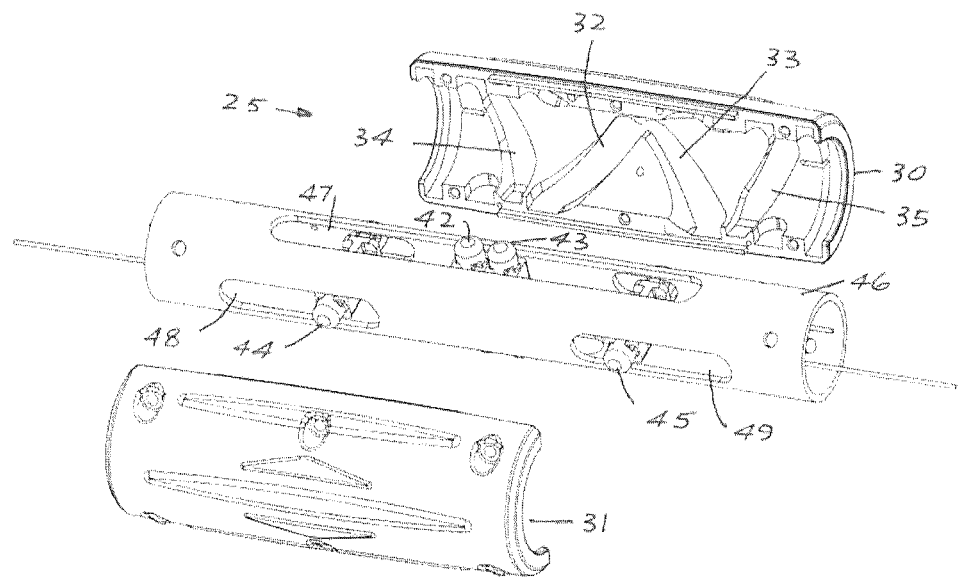
Figure 6:
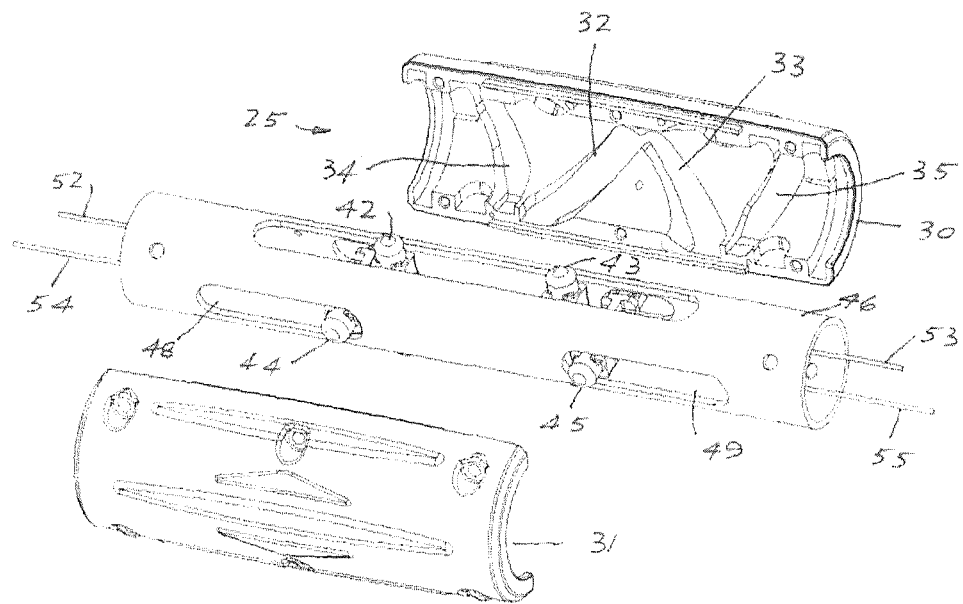
Figure 7:
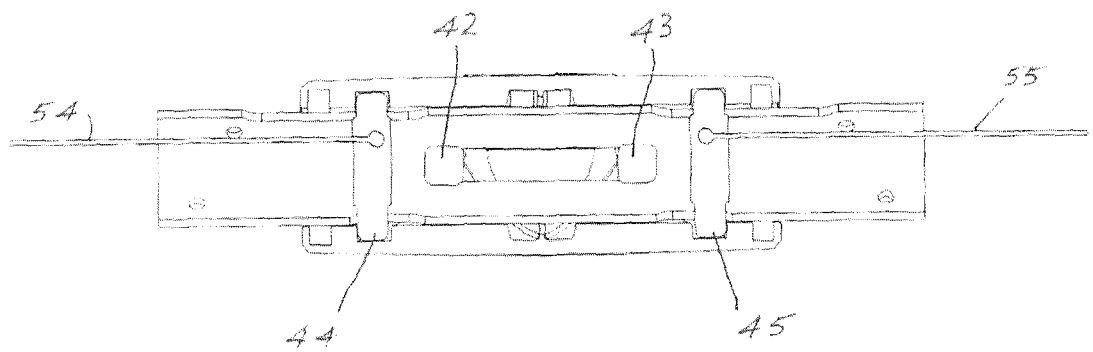
Figure 8:
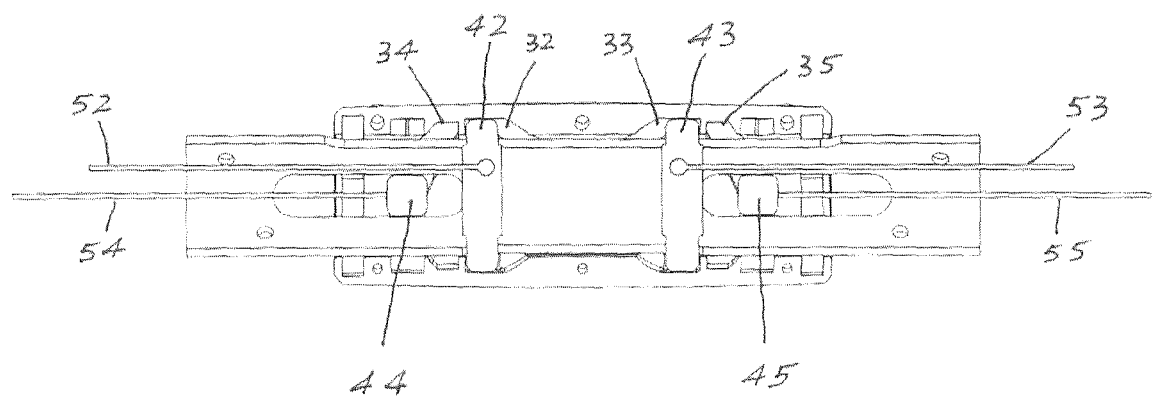
Figure 12:
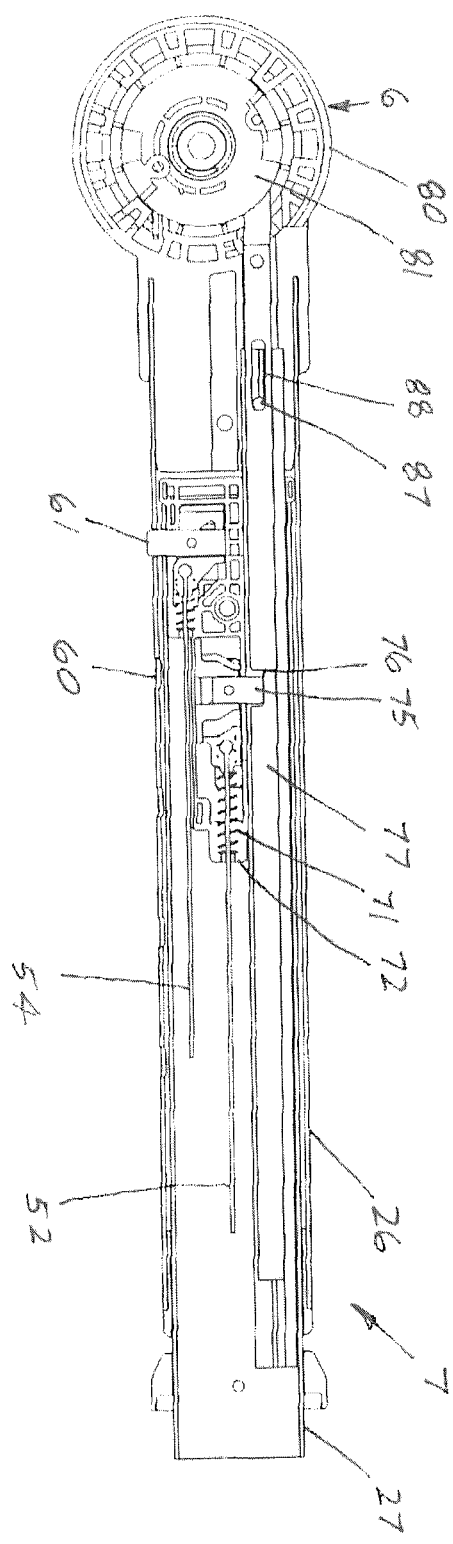
Figure 13:
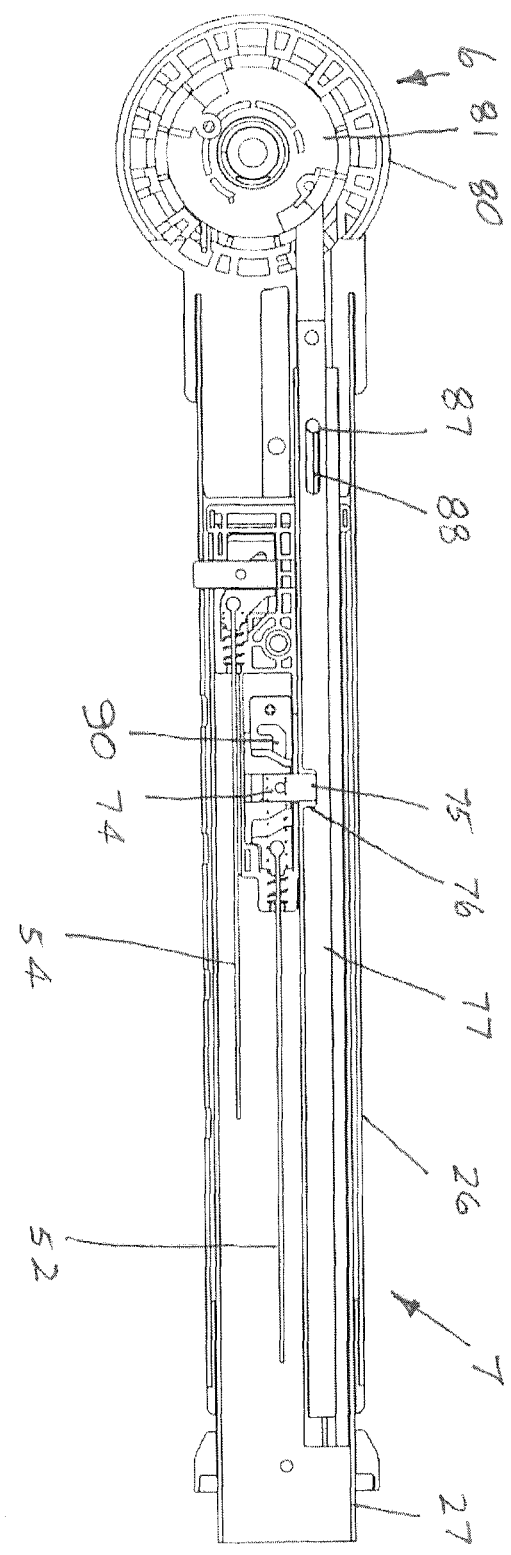
Figure 14:
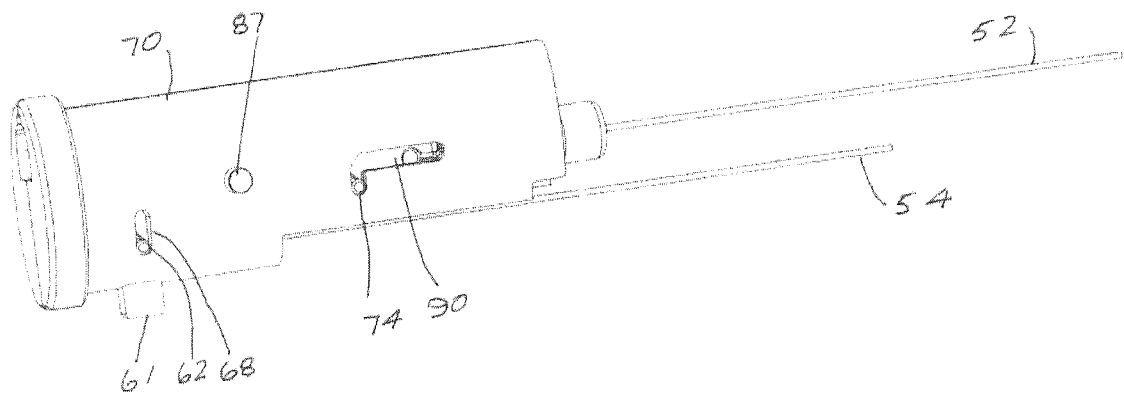
Figure 15:
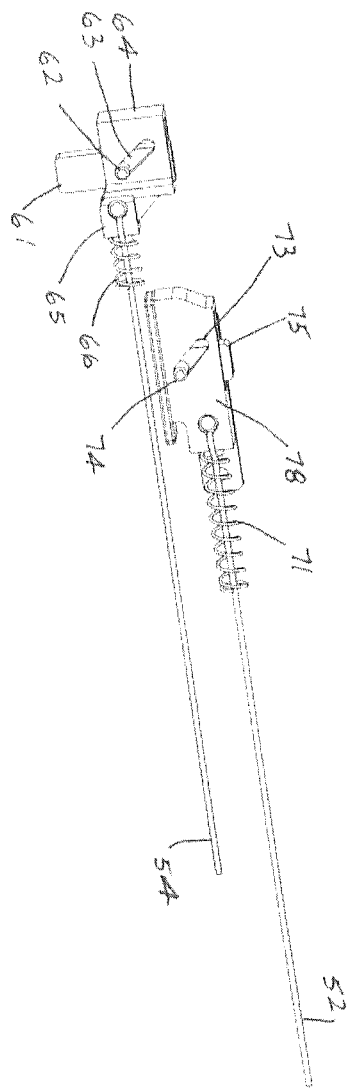
Figure 16:
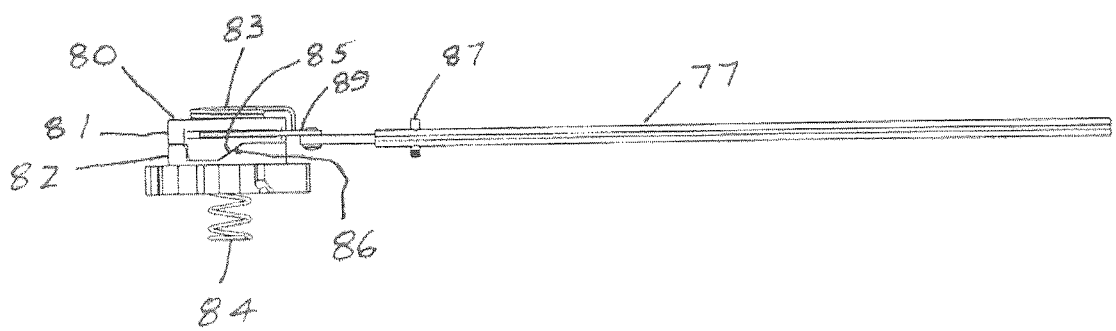
Figure 17:
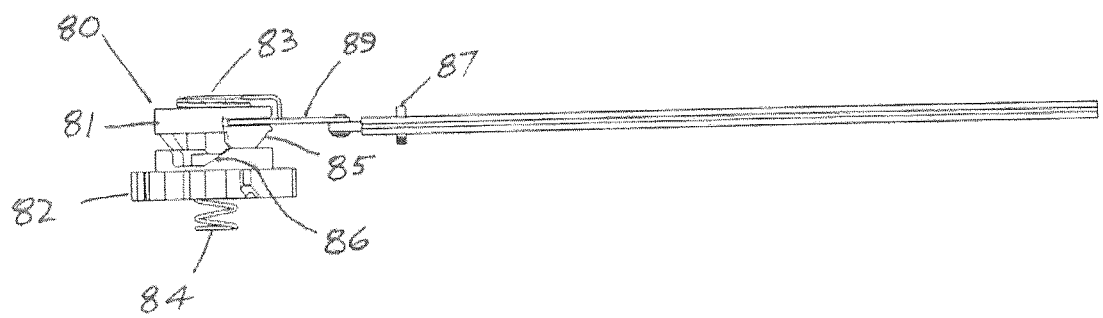
Figure 18:
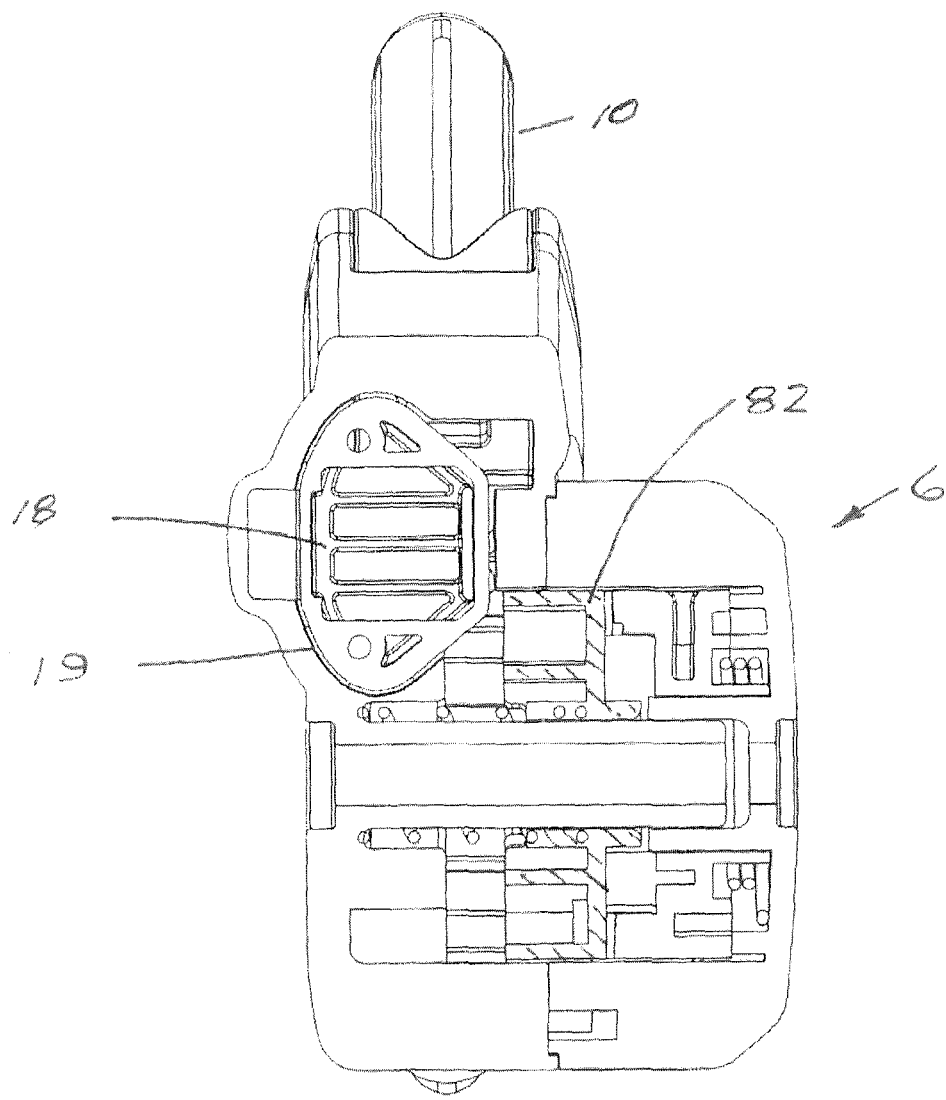
Figure 19:
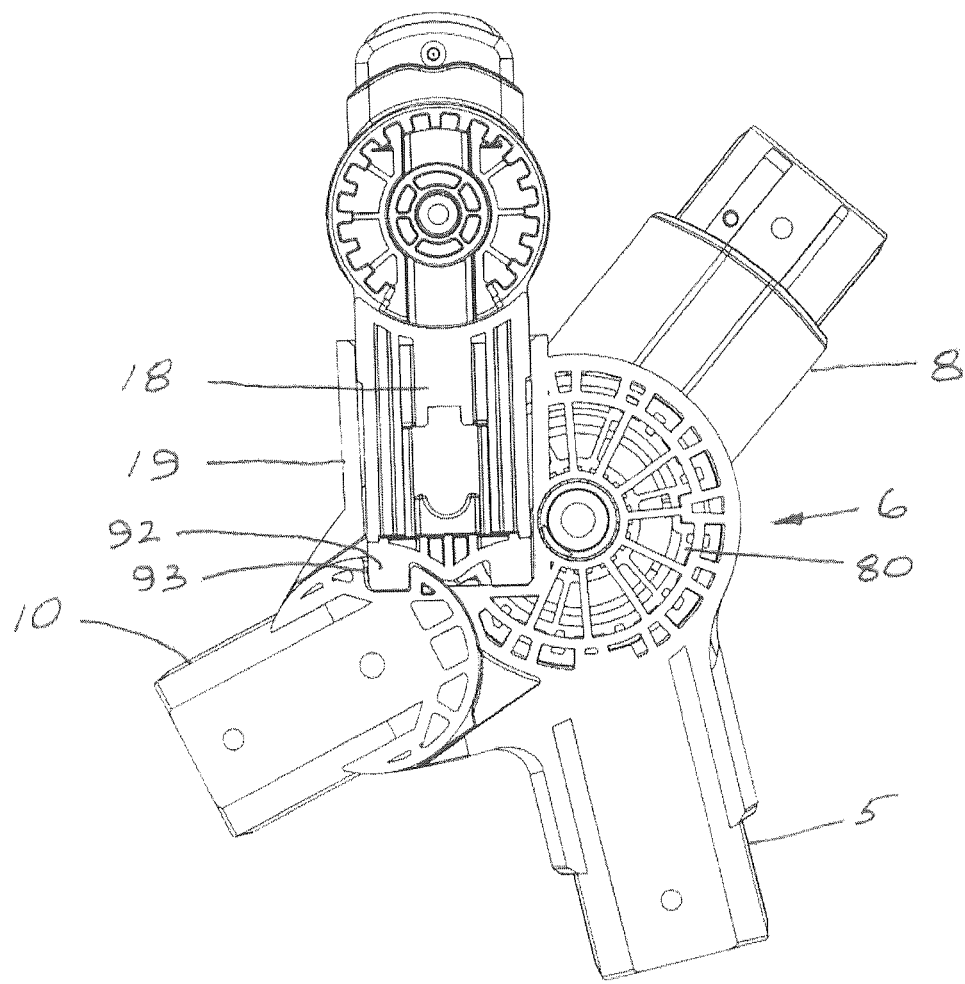
Figure 20:
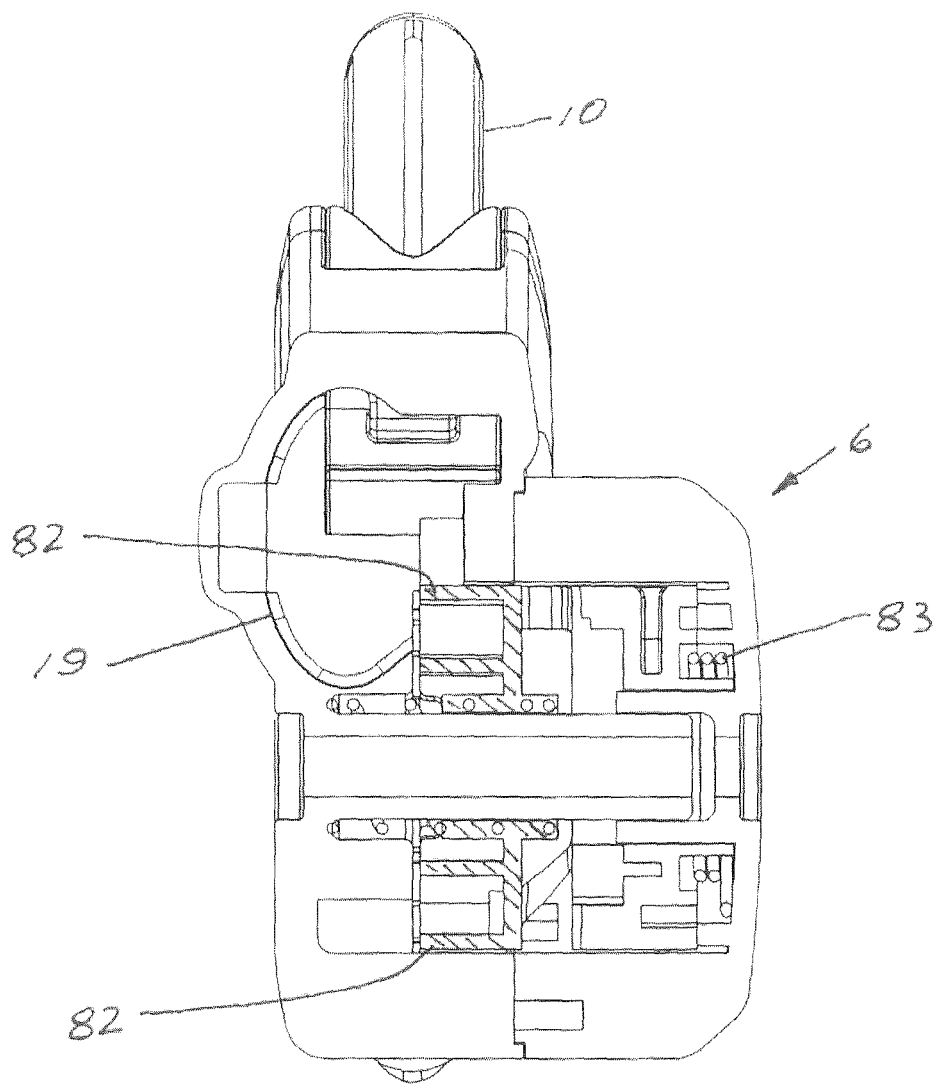
Figure 21:
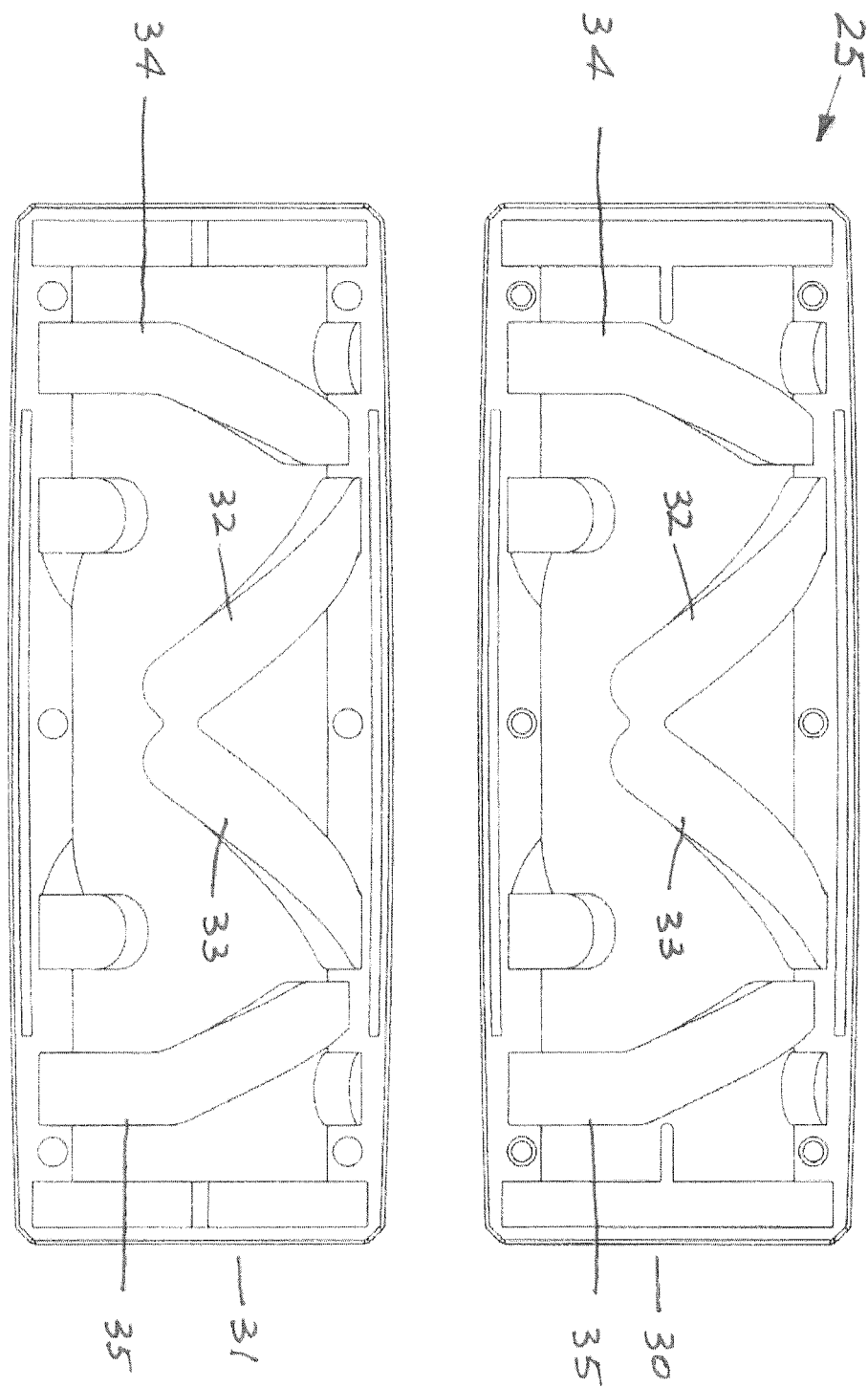

The invention will now be described, by way of example, with reference to the accompanying drawings, in which:

FIG. 1 shows a side view of a folding perambulator in accordance with the further aspect of this invention with a seating member disengaged, FIG. 2 shows a perspective view of a handle assembly in accordance with said one aspect of this invention, FIG. 3 shows a perspective view of a rotatable handle member, FIGS. 4, 5 and 6 show perspective exploded views of the handle assembly with cam followers in differing operational positions, FIG. 7 shows a cut-away top view of the handle member, FIG. 8 shows a cut-away side view of the handle member, FIGS. 9-13 show cut-away side views of part of the handle assembly telescoping arrangement and frame folding locking mechanism in differing operational positions, FIG. 14 shows a detailed view of a body enclosing a cam driven peg and pin for the handle assembly telescoping arrangement and folding locking mechanism, respectively, FIG. 15 shows a perspective view of the peg and pin of FIG. 14 with the body removed, FIGS. 16 and 17 show side views of the dog clutch in differing operational positions, FIG. 18 shows a cut-away top view of the locking mechanism with a seating member in situ, FIG. 19 shows a side view of the locking mechanism with the seating member in situ, FIG. 20 shows a cut-away top view of the locking mechanism with the seating member removed, and FIG. 21 shows a view of the inside of the rotatable handle with one half folded down under the other to show the cam tracks.

In the drawings like reference numerals denote like parts.

The invention will be particularly described, by way of example, with reference to a baby/young child (infant) pushchair, sometimes referred to as a buggy or stroller.

Referring to FIG. 1, the pushchair essentially comprises two main parts, namely a foldable wheeled frame 1 and a seating member 2. The frame 1, in the present example, has a pair of rear wheels 3 rotatably secured by axles 4 to respective rear frame members 5 which have an upper end thereof fixedly secured to a locking mechanism 6. A handle assembly has a tubular U-shaped handle 7 having side limbs 8 which are telescopic so that the handle has differing operational lengths and a lower end of each side limb 8 is pivotally connected by a pivot 9 to the locking mechanism 6. A pair of front frame members 10 have respective wheels 11 attached thereto by pivots 12 so that the pushchair may be steered. The front frame member 10 is attached by a pivot 13 to the locking mechanism so as to be foldable toward the rear frame member 5. The handle 7 is foldable downwardly toward the rear wheels 3. Interconnecting each rear member 5 and front member 10 are over centre, hinged, stays 14 which, in the open position of the pushchair shown in FIG. 1, provide a lock to assist in preventing the front member 10 collapsing toward the rear member 5 and the hinge portion 15 is movable upwardly so as to permit the members 5 and 10 to collapse toward one another.

The seating member 2 has a peripheral frame 16 and a seat portion 17. The seating member is secured into the frame 1 by a depending member 18 on the frame 16 mating inside a tubular member 19 on the locking mechanism. The frame 16 may have a lower portion 20 which is movably adjustable about a pivot 21 and a so-called bumper bar 22, known per se.

The handle 7, shown in FIG. 2, has the pair of side limbs 8 interconnected by a base portion 24 with a rotatable member 25 approximately centrally located in the base portion 24. Each side limb 8 has a lower outer tubular member 26 into which is telescopable a tubular inner upper member 27, the limit of extension of upper member 27 being determined by a stop 28. A lower end of each of the side limbs 8 is terminated in the locking mechanism 6 which includes a dog clutch 80.

The rotatable member 25, more particularly shown in FIG. 3, incorporates cam grooves and cam followers, which will be described later herein with reference to FIGS. 4-8, the cam followers being connected by cables to allow adjustability of the length of the handle and adjustment of the locking mechanism 6, as will also be described later herein, but, in this preferred embodiment, rotation of the handle member 25 in a clockwise direction, with reference to FIGS. 2 and 3, is arranged to operate the locking mechanism 6 only and, rotation of the rotatable member 25 in a counter-clockwise direction, is arranged to permit adjustability of the length of the side limbs 8 of the handle only.

Remote outer edges of the rotatable member 25 have an increased diameter portion 29 to protect an intermediate surface 30 normally gripped by a user from abrasion when the handle is rotated toward the wheels to be in a ground engaging position so that only the portion 29 of the rotatable member 25 will contact a ground surface.

The exploded views of the handle member 25, shown in FIGS. 4-6 and 21, show that the handle member is, preferably, constructed in two opposing half portions 30, 31 each having two pairs of internal grooves 32, 33 and 34, 35. Cam followers 42, 43 are arranged to cooperate with the grooves 32, 33, respectively, and cam followers 44, 45 are arranged to cooperate the interact with the cam grooves 34, 35, respectively. As shown in FIGS. 7 and 8, each of the cam followers 42-45 has a generally square cross-sectioned body with circular cross-sectioned remote end portions that locate within, and cooperate with, the grooves 32-35, respectively.

So as to constrain the cam followers 42-45, a tube 46 is provided about which the handle member 25 rotates. The tube 46 has a longitudinal slot 47 within which cam followers 42, 43 slide and a pair of orthogonally disposed longitudinal slots 48, 49 within which cam followers 44 and 45, respectively, slide, the square cross-sectioned body of the cam followers retaining the cam followers inside the tube 46.

As particularly shown in FIGS. 7 and 8, the body of each cam follower 42 and 43 is connected to a respective cable 52, 53, and the body of said cam follower 44, 45 is connected to a respective cable 54, 55. The grooves 32, 33 and cam followers 42, 43 are arranged to operate the locking mechanism 6, and the cam grooves 34, 35 and respective cam followers 44, 45 are arranged to permit handle length adjustment, the cables being guided and located inside the tubular handle 7.

The grooves 32, 33 are arranged so that the cam followers 42, 43 do not have any tensioning effect on cables 52, 53 when the cam followers 44, 45 are moving within grooves 34, 35 to provide a tensioning pull upon cables 54, 55, thereby permitting adjustment of the handle length. Similarly, the grooves 34, 35 are shaped so that the cam followers 44, 45 do not have any tensioning effect on the cables 54, 55 when the cam followers 42, 43 are moving along grooves 32, 33 to tension cables 52, 53 to disengage the dog clutch 80 of the locking mechanism 6.

In the positions shown in FIG. 4, all of the cam followers 42-45 are in their rest position so that the cables 52-55 are under minimum tension and, effectively, may be considered as un-tensioned.

In the relative positions shown in FIG. 5, the cam followers 42, 43 have moved toward one another, thereby tensioning and pulling on cables 52, 53 to operate the locking mechanism, as will be described hereinafter. It is to be understood that the cam followers 44, 45 are not exerting any tension/pulling action on their respective cables 54, 55.

In the relative positions shown in FIG. 6, the cam followers 44, 45 have moved toward one another, thereby exerting tension and pulling action upon cables 54, 55 to operate a mechanism to permit the handle length to be adjusted. In this position, no translational movement has been effected by cam followers 42, 43 so that the cables 52, 53 remain un-tensioned.

Figure 9:
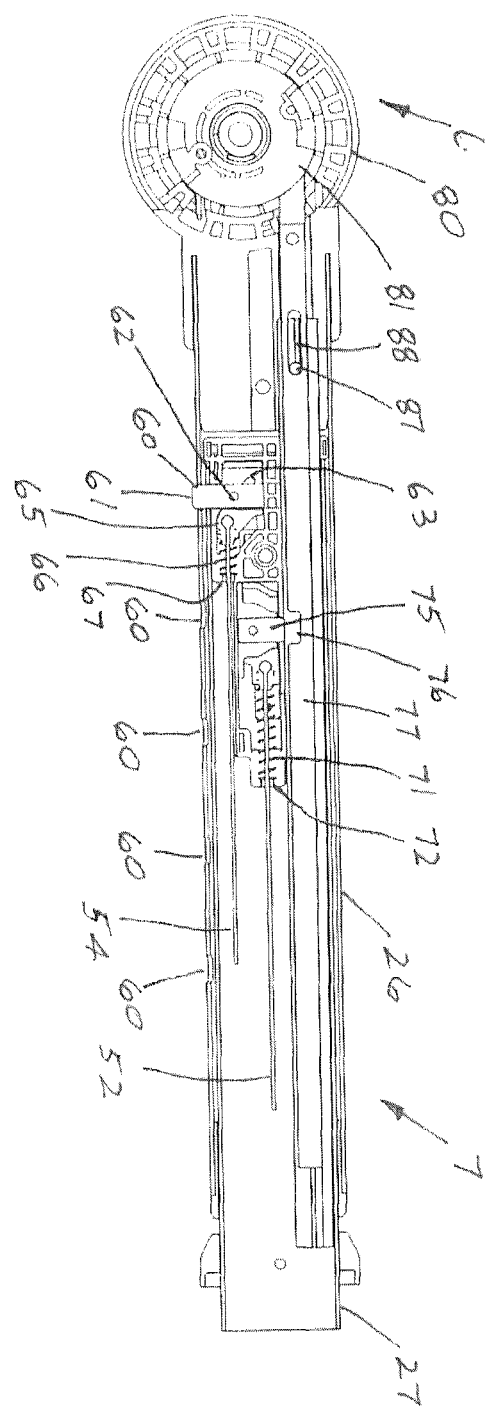
Figure 10:
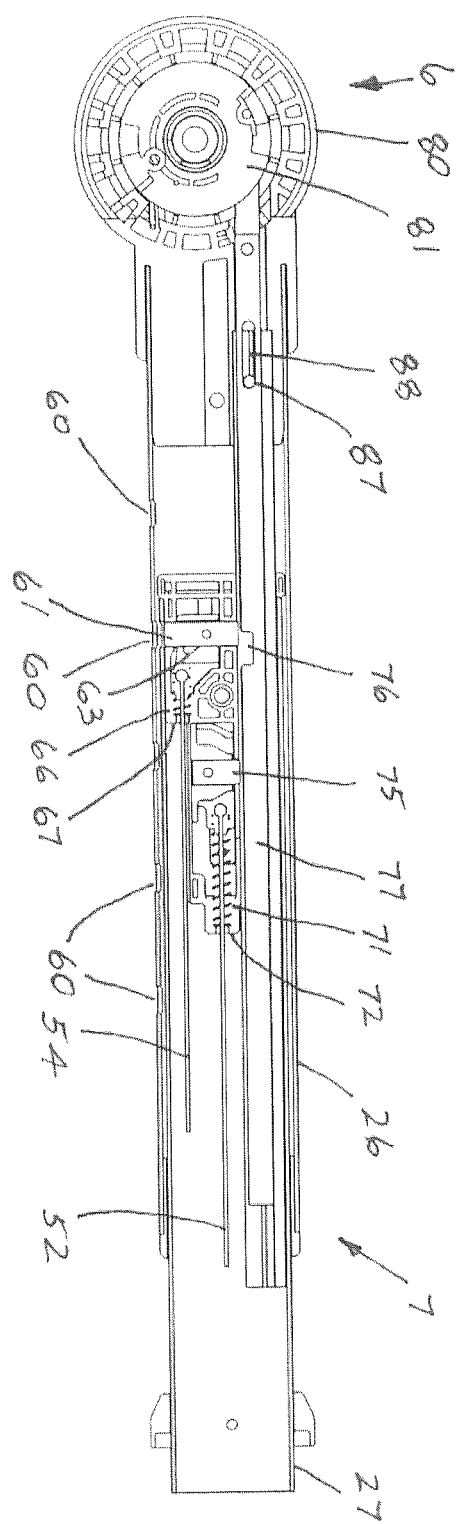

The cut-away section shown in FIG. 9 shows the handle 7 at its lowest position, i.e. with inner tubular members 27 fully telescoped into outer tubular members 26.

Both the outer tubular members 26 have a plurality, in the present embodiment five, longitudinally axially spaced apertures 60, each of which cooperate with a respective reciprocally driveable peg 61 forming part of a handle telescopic locking mechanism actuated by cable 54 (more particularly shown in FIG. 15). It is to be understood that cable 55 activates a similar locking mechanism in the other limb of the U-shaped handle 7. The handle telescopic locking mechanism comprises the peg 61 connected to a transverse follower 62 that is slideably co-operable with an obliquely angled slot 63 within a housing 64 mounted in a plastics case 70 that is securely located within tubular member 27. The housing 64 includes a portion 65 to which an extremity of the cable 54 is secured and the portion 65 is biased by a compression spring 66 acting against an internal wall 67 within the case 70.

Figure 11:
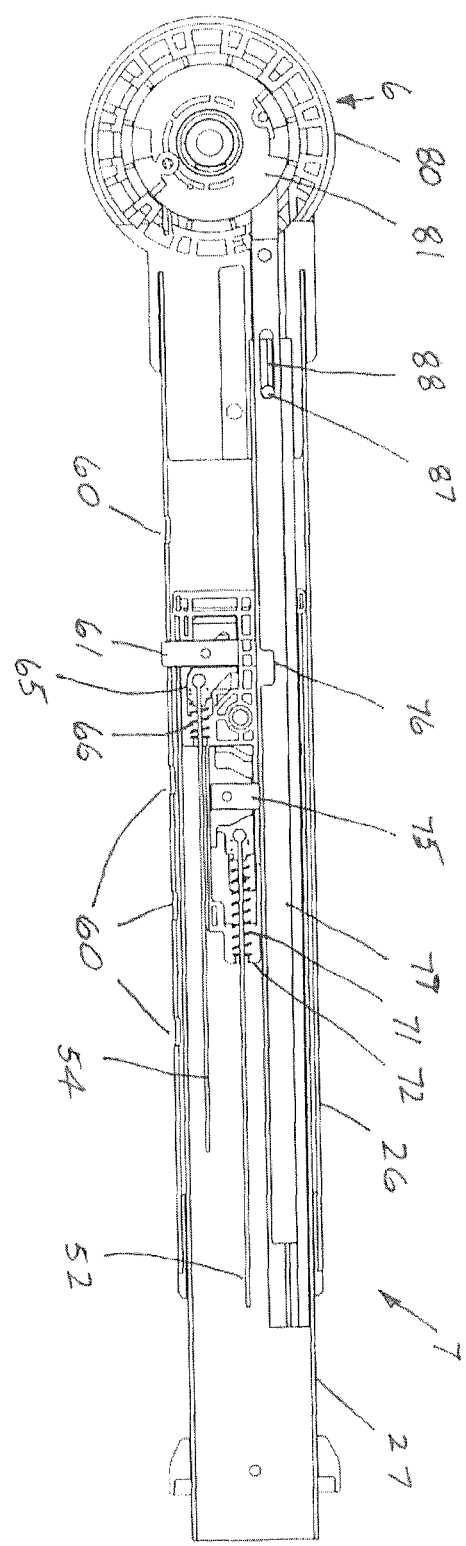

In operation, rotation of the handle member 25 in a counter-clockwise direction causes the cam followers 44, 45 to move inwardly toward one another, thereby tensioning cables 54, 55 and pulling on portion 65 to act against the bias of spring 66. Such action causes transverse follower 62 to move upwardly (radially inwardly) and thereby retracting peg 61 from aperture 60 so that the tubular member 27 may be extended to increase the length of the handle. When a desired length of handle is achieved, the rotational force on the handle member 25 is released so that, under the pressure of compression of spring 66, the peg 61 will move radially outwardly into an appropriate one of the apertures 60. The peg 61, being withdrawn radially inwardly and the spring 66 compressed, is particularly shown in FIG. 10 to permit the tubular member 27 to be extended so that the peg is moved to a different, e.g. an adjacent, aperture 60. FIG. 11 shows the peg 61 being biased radially outwardly by spring 66 into a second one of the apertures 60. As shown in FIG. 14, the transverse follower 62 is also constrained to move within a circumferential slot 68 within the case 70.

Referring now to FIGS. 9-15, cable 52 (like cable 53, not shown) is attached at an extreme end to a body 78 that is biased by a compression spring 71 acting against a wall 72 within the case 70. The body 78 has an obliquely angled slot 73 acting as a cam for a cooperating follower 74 securely attached to a rectangularly cross-sectioned pin 75 which is arranged to engage with a slot 76 in a selector rod 77. The selector rod 77 is connected to an inner portion 81 of a dog clutch 80, the dog clutch having an outer portion 82 with outer teeth that engage with inner teeth in a housing of the dog clutch. The inner portion 81 is rotatably biased by a torsion spring 83 into engagement with the outer portion 82 and the outer portion 82 is biased toward the inner portion 81 by a compression spring 84. The inner and outer portions 81, 82 have cooperating cam surfaces 85, 86. Longitudinal travel of the selector rod 77 is restricted by a pin 87 attached to the selector rod being movable within a fixed longitudinal slot 88. So as to permit reciprocal movement of the selector rod 77 and rotational movement of the inner portion 81 of the dog clutch, so the selector rod is connected by a pivoted link 89 (as shown in FIGS. 16 and 17).

In FIG. 14, it will be seen that the case 70 includes an L-shaped slot 90 in which the follower 74 is confined.

In the position of the locking mechanism 6 shown in FIGS. 9, 10, 11, 14, 15 and 16, no tension is exerted on the cable 52 and the spring 71 biases the pin 75 to be radially innermost and the dog clutch has inner and outer portions with the teeth engaged.

It will be noted from FIG. 11 that unless the peg 61 is in the lowermost, i.e. extreme left hand, as shown in the FIGS. 9-13 position, so the pin 75 is not extendable radially outwardly. As shown in FIG. 9, when peg 61 is in the lowermost aperture 60, pin 75 may be engaged into slot 76 by tensioning cable 52 against the bias of spring 71. It will be realised that cable 52 is tensioned by rotating the handle 25 in a clockwise direction to move the followers 42, 43 within grooves 32, 33 so that they move inwardly toward one another. The action of tensioning the cable 52 causes follower 74 to move upwardly within the L-shaped slot 90, shown in FIG. 14, and into the aperture 76 in the selector rod 77. Further rotation of the handle 25 causes the follower 74 to move along slot 73, thereby camming the pin 75 radially outwardly, as shown in FIG. 12. Further tension on the cable 52 causes the follower 74 to move longitudinally along the slot 90 and the selector rod 77 to move to the right, as shown in FIGS. 9-13, until limited by a left hand side of the slot 88 abutting pin 87 (FIG. 13). The longitudinal movement of the selector rod 77 causes rotation of the inner portion 81 of the dog clutch 80 and the cam surfaces 85, 86 to ride against one another so that the outer portion 82 is moved against the force of compression spring 84 and the teeth of the dog clutch are moved out of engagement by the outer teeth on the outer portion 82 disengaging the inner teeth on the dog clutch housing, as shown in FIG. 17. The handle 7 may now be rotated downwardly toward the rear wheels 3 and the hinged stays 14 to be moved upwardly so as to permit the front wheels 11 to be moved toward the rear wheels 3, and the frame to also collapse inwardly. The foregoing assumes that the seating member 2 is not in position.

It will, therefore, be understood that rotation of the rotatable member 25 in one direction permits the length of the telescopic handle to be adjusted, but will not permit the frame to fold, whereas rotation of the handle in an opposite direction permits the frame and handle to be folded, but will not allow the handle length to be adjusted. There is, thus, an interlock between the two forms of operation, i.e. handle length adjustment, and frame and handle collapsible movement.

Referring now to FIGS. 18, 19 and 20. In FIG. 18, the depending member 18 is located in tubular member 19 and, preferably, whilst in situ, depending member 18 also prevents the dog clutch 80 from disengaging. In this position, as also shown in FIG. 19, a tang 92 at the base of depending member 18 is arranged to engage in an aperture 93 in the front member 10 to also lock the front frame member from folding. Thus, the front frame member 10 can only be folded toward the rear frame member 5 when the seating member 2 is removed.

As shown in FIG. 20, the depending member 18 is removed and the outer portion 82 of the dog clutch has moved into a recess within tubular member 19 to permit the pushchair to be folded.

From the foregoing it will be understood that various interlocks are provided by the present invention and handle length adjustment as well as collapsibility is achieved by a single actuator, namely rotatable member 25.

The invention claimed is:

1. A handle assembly for a folding perambulator including adjustable length handle means including a rotatable member which, in one direction of rotation, is arranged to permit adjustment of the length of said handle means only and, in an opposite direction of rotation, is arranged to adjust locking means located at a remote end of said handle means to permit the handle means to rotate about a frame, in operation, attached to said handle means.

2. A folding perambulator including a wheeled foldable frame, and seating means detachably secured to said foldable frame, said frame having locking means arranged to hold the frame in one of an open and closed position, and adjustable length handle means arranged to predeterminedly adjust the length of said handle means, said handle means including a rotatable member which, in one direction of rotation is arranged to permit adjustment of the length of said handle means only, and in an opposite direction of rotation is arranged to adjust the locking means only to permit the frame to close.

3. A folding perambulator as claimed in claim 2, wherein the seating means includes a member arranged to interact with the locking means to prevent the foldable frame from folding when the seating means is in situ thereon.

4. A folding perambulator as claimed in claim 3, wherein the handle means is generally U-shaped and the rotatable member is located in a base portion of the U-shape.

5. A folding perambulator as claimed in claim 4, wherein the U-shaped handle means has side limbs formed by telescopic tubular members to permit length adjustability and the length thereof is secured by a peg inside an internal member of each side limb of the U-shape interlocking into one of a plurality of apertures located in an outer tubular member.

6. A folding perambulator as claimed in claim 5, wherein both said pegs are biased outwardly towards said apertures by respective spring means and each peg is attached by a respective cable to a respective follower arranged to engage with respective cam means located in said rotatable member, wherein rotation of said handle in said one direction causes the followers to move toward one another against the bias of said spring means to retract each said peg from their respective apertures to permit the handle means length to be adjusted.

7. A folding perambulator as claimed in claim 4, wherein the locking means includes a pair of locking mechanisms provided at a junction of an extremity of each U-shaped side limb and the frame, and each locking mechanism includes a dog clutch arranged to move out of engagement to permit the frame to open or close.

8. A folding perambulator as claimed in claim 7, wherein inter-engaging teeth on the dog clutch are arranged to be moved into and out of engagement by a reciprocal selector rod rotating one portion of the dog clutch about further cam means against the bias of further spring means arranged to bias the two portions of the dog clutch into engagement.

9. A folding perambulator as claimed in claim 8, wherein each selector rod is reciprocal to disengage the dog clutch only when the handle is in a minimum length position and said each selector rod is arranged to be engaged by a spring biased cam driven pin which is connected by a further cable to another follower arranged to engage another cam means located in said rotatable member, wherein rotation of said handle in said opposite direction of rotation causes the another followers to move toward one another while said followers remain stationary, thereby tensioning the further cables and causing one portion of the dog clutch to move about the further cam means and out of engagement with the other portion of the dog clutch to enable the frame to open or close.

10. A folding perambulator as claimed in claim 9, wherein the member of said seating means is arranged to prevent said one portion of the dog clutch from moving out of engagement with the other portion of the dog clutch when the seating means is located on the foldable frame.

11. A folding perambulator as claimed in claim 2, wherein the rotatable member has remote outer edges of increased diameter to protect an intermediate surface of said rotatable member from abrasion when the frame is closed and the handle means is folded toward the wheels of said foldable frame to be ground engaging.

12. A folding perambulator as claimed in claim 5, wherein the locking means includes a pair of locking mechanisms provided at a junction of an extremity of each U-shaped side limb and the frame, and each locking mechanism includes a dog clutch arranged to move out of engagement to permit the frame to open or close.

13. A folding perambulator as claimed in claim 8, wherein inter-engaging teeth on the dog clutch are arranged to be moved into and out of engagement by a reciprocal selector rod rotating one portion of the dog clutch about further cam means against the bias of further spring means arranged to bias the two portions of the dog clutch into engagement.

14. A folding perambulator as claimed in claim 10, wherein each selector rod is reciprocal to disengage the dog clutch only when the handle is in a minimum length position and said each selector rod is arranged to be engaged by a spring biased cam driven pin which is connected by a further cable to another follower arranged to engage another cam means located in said rotatable member, wherein rotation of said handle in said opposite direction of rotation causes the another followers to move toward one another while said followers remain stationary, thereby tensioning the further cables and causing one portion of the dog clutch to move about the further cam means and out of engagement with the other portion of the dog clutch to enable the frame to open or close.

* * * * *